(12) United States Patent
Gonzalez Martin et al.

(10) Patent No.: US 12,353,799 B2
(45) Date of Patent: Jul. 8, 2025

(54) GENERATION OF AN OBJECT MODEL FOR THREE DIMENSIONAL PRINTERS

(71) Applicant: Peridot Print LLC, Palo Alto, CA (US)

(72) Inventors: Serigo Gonzalez Martin, Sant Cugat del Valles (ES); Cristina Gonzalez Delgado, Sant Cugat del Valles (ES); Jordi Roca Vila, Sant Cugat del Valles (ES)

(73) Assignee: Peridot Print LLC, Palo Alo, CA (US)

( * ) Notice: Subject to any disclaimer, the term of this patent is extended or adjusted under 35 U.S.C. 154(b) by 327 days.

(21) Appl. No.: 17/758,091

(22) PCT Filed: Jan. 29, 2020

(86) PCT No.: PCT/US2020/015681
§ 371 (c)(1),
(2) Date: Jun. 28, 2022

(87) PCT Pub. No.: WO2021/154244
PCT Pub. Date: Aug. 5, 2021

(65) Prior Publication Data
US 2023/0032439 A1 Feb. 2, 2023

(51) Int. Cl.
*G06F 30/10* (2020.01)
*B29C 64/386* (2017.01)
*B33Y 50/00* (2015.01)
*G06F 113/10* (2020.01)

(52) U.S. Cl.
CPC ............ *G06F 30/10* (2020.01); *B29C 64/386* (2017.08); *B33Y 50/00* (2014.12); *G06F 2113/10* (2020.01)

(58) Field of Classification Search
CPC ... G06F 30/10; G06F 2113/10; B29C 64/386; B33Y 50/00
See application file for complete search history.

(56) References Cited

U.S. PATENT DOCUMENTS

| | | | |
|---|---|---|---|
| 8,254,667 B2 | 8/2012 | Kim et al. | |
| 9,514,397 B2 | 12/2016 | Peek | |
| 9,691,110 B2* | 6/2017 | Boronvinskih | ........ B33Y 50/02 |
| 10,249,082 B1 | 4/2019 | Baeli et al. | |
| 10,328,686 B2 | 6/2019 | Iverson et al. | |
| 2014/0269282 A1* | 9/2014 | Cardona | ............. H04L 43/0888 |
| | | | 370/230 |

(Continued)

FOREIGN PATENT DOCUMENTS

| | | |
|---|---|---|
| CN | 103886166 B | 8/2016 |
| CN | 106200559 A | 12/2016 |

(Continued)

*Primary Examiner* — Nicholas Klicos
(74) *Attorney, Agent, or Firm* — Michael Dryja

(57) ABSTRACT

Object model data is obtained, representing one or more objects to be generated by an additive manufacturing system. An object model is generated, representing an arrangement of the one or more objects within a build volume, by determining a solution to a packing optimization function. A layer of the object model is analysed to determine a parameter representing the complexity of the layer, and if the determined parameter exceeds a given threshold, the process is repeated by generating a revised object model representing a different arrangement of the one or more objects within the build volume.

20 Claims, 5 Drawing Sheets

(56) References Cited

U.S. PATENT DOCUMENTS

| | | | | |
|---|---|---|---|---|
| 2014/0350898 A1* | 11/2014 | Tschanz | .................. | G06F 30/00 |
| | | | | 703/1 |
| 2015/0057784 A1* | 2/2015 | Butler | .................... | G06F 3/1288 |
| | | | | 700/119 |
| 2015/0251358 A1* | 9/2015 | Ho | ........................ | B29C 64/393 |
| | | | | 425/140 |
| 2016/0152358 A1* | 6/2016 | Divine | ................ | G05B 19/4099 |
| | | | | 206/525 |
| 2016/0339643 A1* | 11/2016 | Dikovsky | .............. | B29C 64/112 |
| 2017/0173886 A1* | 6/2017 | Menchik | ................. | B33Y 30/00 |
| 2017/0173889 A1* | 6/2017 | Thomas-Lepore | ... | H04L 51/046 |
| 2017/0239720 A1* | 8/2017 | Levin | ..................... | B28B 1/001 |
| 2017/0343984 A1* | 11/2017 | Czinger | ................. | B33Y 50/00 |
| 2018/0093417 A1* | 4/2018 | Yaw | ....................... | B29C 64/393 |
| 2019/0033828 A1* | 1/2019 | Madelone, Jr. | .......... | B22F 10/80 |
| 2020/0231803 A1* | 7/2020 | Amiel-Levy | .......... | B33Y 40/10 |

FOREIGN PATENT DOCUMENTS

| | | | |
|---|---|---|---|
| CN | 107635750 A | 1/2018 | |
| CN | 108556364 A | 9/2018 | |
| CN | 108608639 A | 10/2018 | |
| KR | 10-2017-0089143 A | 8/2017 | |
| WO | WO-2018080440 A1 * | 5/2018 | ........... B29C 64/153 |

* cited by examiner

GENERATION OF AN OBJECT MODEL FOR THREE DIMENSIONAL PRINTERS

BACKGROUND

Additive manufacturing machines produce 3D objects by building up layers of material. Some additive manufacturing machines are commonly referred to as "3D printers". 3D printers and other additive manufacturing machines make it possible to convert a CAD (computer aided design) model or other digital representation of an object into the physical object. The model data may be processed into slices each defining that part of a layer or layers of build material to be formed into the object. Build material may comprise any suitable form of build material, for example fibres, granules or powders. The build material can include thermoplastic materials, ceramic material and metallic materials.

DETAILED DESCRIPTION

In some additive manufacturing processes, a binder or a fusing agent may be used to bind together particles of a thin layer of build material formed on a build platform to form a layer of solid object or part.

A layer of build material may be formed by a manufacturing machine having a roller or spreader that spreads the powder to thereby provide successive layers on a build platform. A print nozzle may then jet binder agent or fusing agent at precise locations on to the powder bed to define the geometry of the single or multiple parts to be printed. This process may be repeated until the part or parts are formed layer by layer. An energy emitter may assist with the evaporation of liquid components of the binder agent or fusing of material at locations where agent has been deposited, and in different systems this curing may be carried out either layer by layer or in respect of the whole build volume once all layers have been formed.

By analysing a two-dimensional image of a layer of a three-dimensional print job to be printed, a processor of the additive manufacturing system processes the three-dimensional print job and determines print instructions indicating precisely when binder or fusing agent is to be deposited on the print layer, for example as a carriage including the print nozzle moves over the layer of build material. This determination may be completed on a layer by layer basis before each layer is jetted with agent. Due to constraints of the printing process, for example a desire to maintain a uniform temperature of the build material during printing, the process of spreading powder and depositing agent is to be completed in the same fixed period of time irrespective of the layer, and so the time available for the analysis to be completed is limited. For some layers having a high level of complexity, this available time may not be sufficient for the processor of the additive manufacturing machine to complete the analysis of the layer to determine precisely where agent is to be deposited. These layers have an adverse effect on the additive manufacturing process and can result in reduced print quality, or a failure of the print job where an error is generated due to the layer information not being processed in the available time.

The described method allows a determination to be made as to whether a three-dimensional print job includes layers which are considered to include a level of complexity which may cause a print job to fail, and allows the print job to be modified to remove such complexity. This determination may be made before the print job is sent to the printer. In this way, it is possible to avoid wasting time and build material in printing a print job which will have reduced print quality or potentially fail due to an error during printing, as a result of the print job including complex layers, and it is possible instead to generate a revised print job for printing.

Figure 1:
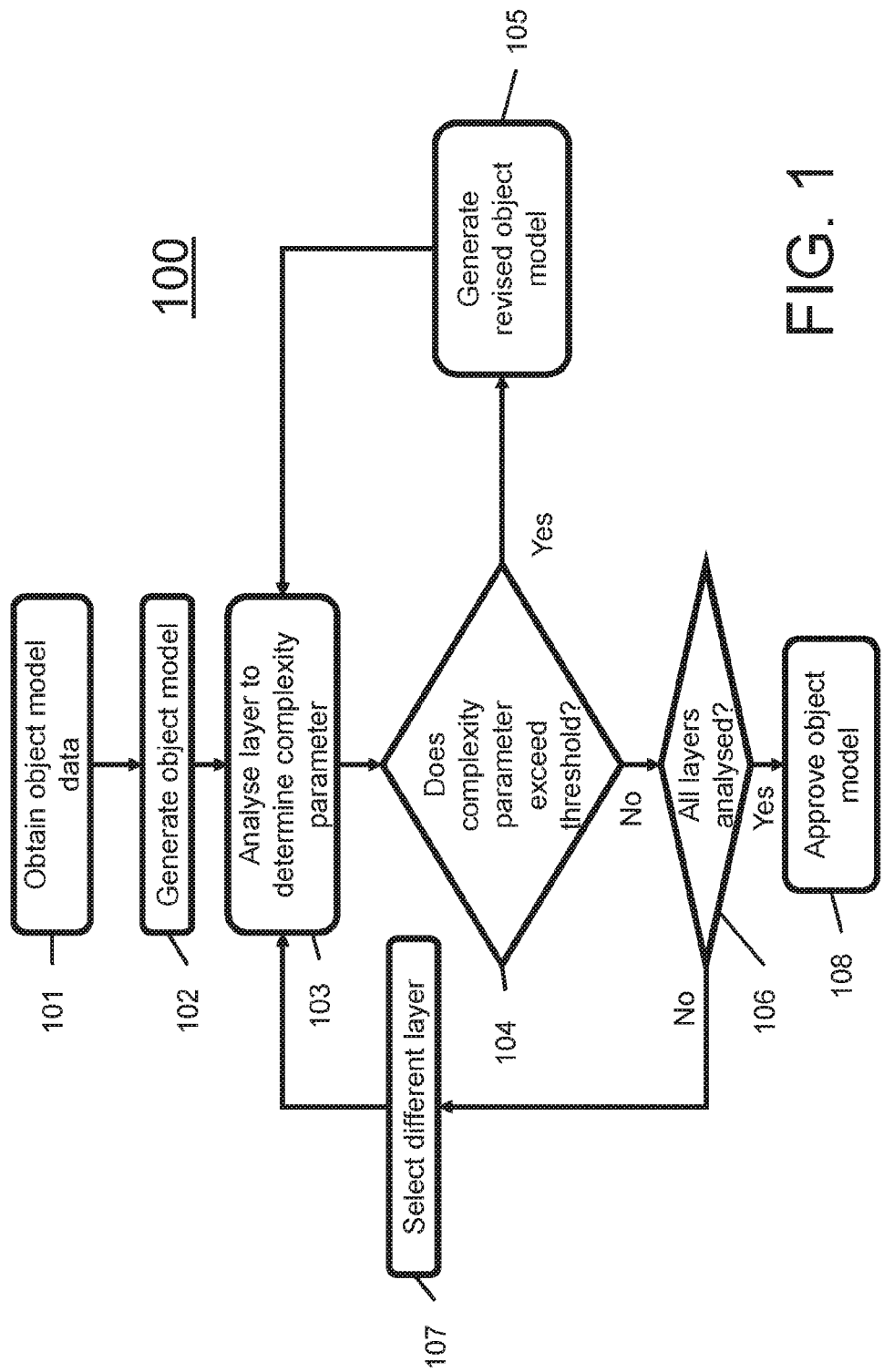
FIG. 1 shows an example method for generating an object model suitable for printing.

FIG. 1 shows an example of a method 100 for generating an object model suitable for printing. Object model data is obtained at 101, which may represent one or more objects to be generated by a 3D printer. Based on this object model data, at 102 an object model is generated, representing an arrangement of the one or more objects within a build volume, by determining a solution to a packing optimization function. A layer of the object model is analysed at 103 to determine a parameter representing the complexity of the layer, and at 104 it is determined whether the determined complexity parameter exceeds a threshold, indicating that the complexity parameter of the layer exceeds a given complexity. The inclusion of such a layer in the object model indicates that the object model may cause the print job to fail because the identified layer may take too long to process during printing, particularly in a printing process that has a substantially fixed processing time available for each layer. The determination at 104 may be a simple comparison of the complexity parameter with a threshold value. Depending on the nature of the complexity parameter, a higher value of the complexity parameter may indicate an increased complexity of the layer, while in other examples a lower value of the complexity parameter may indicate an increased complexity of the layer, and therefore a layer exceeding a given complexity may be indicated by a complexity parameter being either greater than, or less than, a threshold value, depending on the definition of the complexity parameter. Examples of the calculation of the complexity parameter are described in more detail below. If it is determined at 104 that the complexity parameter exceeds the threshold, a revised object model is generated at 105, representing a different arrangement of the one or more objects within the build volume. This revised model may be generated by determining a different solution to the packing optimization function than was generated at 102, for example by determining a solution from a different seed value as described in more detail below, or by using a different packing optimization function, or by any other method which results in a different optimized solution. Once the revised object model has been generated, the method continues from 103 using the revised object model. In this example, if it is determined at 104 that the complexity parameter does not exceed the threshold, then it is determined at 106 whether all layers of the object model have been analysed. If not all layers have been analysed, then a different layer is selected at 107 and the method continues from 103 by analysing this different layer of the object model to determine its complexity parameter. If it is determined at 106 that all layers of the object model have been analysed, then in this example, the object model is approved at 108. This method may be carried out until an approved object model is generated or, in some examples, until a timeout period is exceeded.

Figure 2:
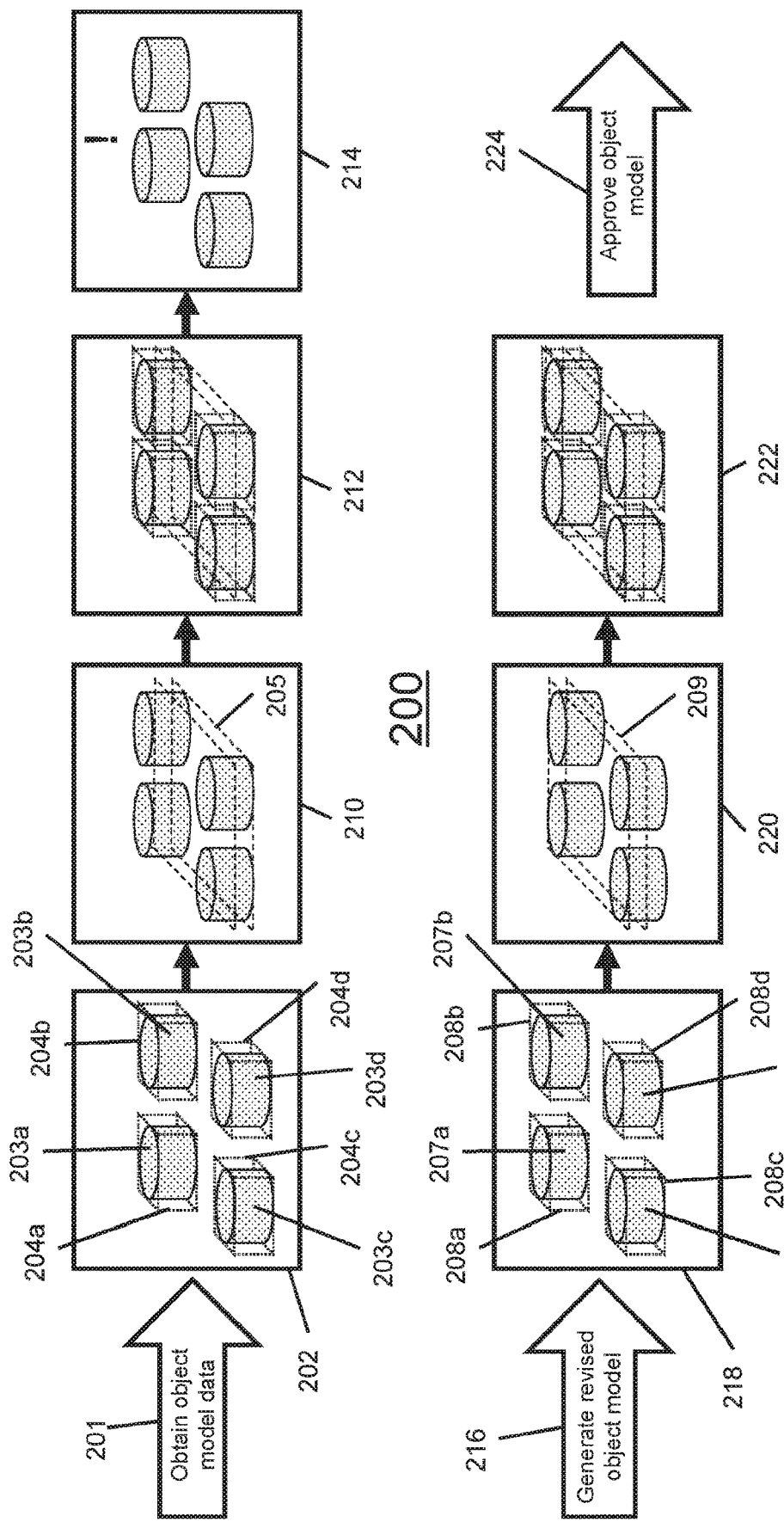
FIG. 2 shows schematically a further example process for generating an object model suitable for printing.

FIG. 2 shows an example process for generating and determining the complexity of an object model. In this example, object model data is obtained at 201 by a pre-print application 202, which may be incorporated inside or outside of a 3D printer. The object model data may be parsed into separate objects to be printed and a bounding box for each of the separate objects. These bounding boxes may define a minimum sized box containing all of the associated object. For example, the bounding box may be aligned in the X, Y and Z axes, wherein the bounding box may have coordinates that encompass the entirety of the respective object. The cross-sections of the bounding boxes may therefore be uniform in one axis, for the entire object. In the above example, the bounding box cross-section may be the same irrespective of the Z axis coordinate. In some examples, the bounding boxes may be determined separately after receiving the object model data.

Based on the object model data, an object model may be generated, which represents an arrangement of the one or more objects within a build volume. In this example, the object model comprises four objects 203a to 203d, each being associated with respective bounding boxes 204a to 204d. While in this example all of the objects are the same, it may be that some or all of the objects are different from one another. The object model is generated in accordance with a packing optimization function, by determining a solution to the optimization function. Each solution represents an arrangement of the one or more objects within the build volume. The optimization function may, in some examples, be related to a printing profile of the 3D printer. For example, the optimization function may be a thermal uniformity function. In this example, it may be the case that the user wishes to achieve thermal uniformity for all of the objects. In some examples, the optimization function may be a layer density function. In this example, the user may want to maintain a particular density of objects in layers of the object model. Other packing optimization functions may be selected depending on user preferences and/or parameters of the printer, in order to determine an appropriate packing arrangement of the object(s) within the build volume. The pre-print application may determine an optimized solution to the optimization function from an initial seed value. This optimized solution, representing a packing configuration for the object(s), may then be used for generating the object model corresponding to this packing arrangement. While some examples of optimization functions are given above, it should be understood that the optimization function may be any form of packing function.

The object model is analysed at 210 to determine whether its complexity is such that the objects may not be properly processed during printing. In particular, if the object model includes any layers having a high level of complexity, as represented by the layer including a large number of voxels to be printed by the 3D printer, then there is an increased likelihood that the time taken to process the information for printing that layer may exceed the time available to process the layer during printing, causing the print job to fail. In this example, the object model comprises a number of object layers, one of which is illustrated as layer 205. At 212, a selected layer is analysed to determine a parameter representing the complexity of the layer. The value of this layer complexity parameter may reflect whether a layer is too complex to be processed within the available layer processing time, which may reflect that the object model would cause a print job to fail if sent to a printer. In some examples, the complexity parameter of the layer may be determined based on the accumulated area in the layer of all object bounding boxes intersecting the layer. In some examples, the complexity parameter of the layer may be represented as a comparison of (i) a total printable area in the layer; and (ii) the accumulated area of the cross-sections of the bounding boxes. For example, the layer complexity parameter may be determined as a ratio of the total printable area to an area of the cross-sections of the bounding boxes. This layer complexity parameter may be utilized in order to determine whether the layer is either, (i) a simple layer, possibly reflecting a layer that is suitable for printing; or (ii) a complex layer, possibly reflecting a layer that is too complex to be processed within the available layer processing time during printing, and this determination may be made on the basis of whether the parameter exceeds a given threshold. If a complex layer is identified, the object model is rejected at 214. If the layer is not identified as a complex layer, then the method may proceed to the determination of the complexity parameter of a different layer. In this way, a complexity parameter may be determined for a number of the layers. For example, the pre-print application may sequentially determine a complexity parameter for each of the layers, or may determine a complexity parameter for a number of sequential layers until such time as the determined parameter for any particular layer exceeds the threshold.

Determining the layer complexity parameter may comprise determining a thickness of the layer. For example, the thickness may be determined based on the printer. Determining the thickness may enable identification of the objects that intersect with the layer 205. In the example of FIG. 2, all four objects intersect with the layer 205. Because all of the objects intersect with the layer, the areas of the bounding boxes for all of the objects may be accumulated to determine the complexity parameter for that layer. In some examples, and for some layers, not all of the objects may intersect the layer, and so the cross-sections of the bounding boxes for just the objects intersecting that layer may be accumulated.

The area of the bounding boxes of the objects at the intersection with a given layer is indicative of the number of voxels to be processed for that layer. Accordingly, a larger area is indicative of a larger number of voxels to be processed, which corresponds to an increased complexity of the layer and an increase in the time taken for the printer to process that layer during printing. Where a layer has a level of complexity such that the time taken for the printer to process the layer during printing exceeds the available time, this may cause the print job to fail. In this example, such a layer may be deemed too complex to be printed, either at all or with the intended quality. For example, this may be the case if the area of the bounding box of an object, or of an accumulated area of the bounding boxes, at the intersection with a layer is too great.

In order to determine the accumulated area of the intersecting bounding boxes, a cross-sectional area of each bounding box intersecting with the layer may be determined for a given layer. The bounding box may represent a 3D voxel map, and so the cross-sections may represent a 2D pixel map. The area that these cross-sections occupy, possibly reflecting a density of pixels that may need to be processed by a printer, may be accumulated to generate an accumulated area value. For example, the accumulated area occupied by the bounding boxes in an XY axis may be determined, with the layers being placed on top of one another in the Z axis. The bounding boxes of each respective object may also overlap. In this example, the accumulated area may be determined by either accumulating the total area of the cross-sections for the bounding box of each object, or deducting the overlapping regions from the calculated accumulated area.

Based on the accumulated area of the cross-sections, the layer complexity parameter may be determined. As described above, this may entail comparing the total printable area to the accumulated area to determine a parameter comprising a ratio of the two values. Alternatively, the parameter may comprise the accumulated area value itself. The determined parameter may be compared with a threshold value, which may reflect a pre-determined value beyond which the available processing time for a given layer during printing may not be sufficient. For example, where the parameter is a ratio of the total printable area to an accumulated area of the cross-sections of the bounding boxes, the threshold may be selected to have a value that reflects that the layer may be too complex to be processed in the available time during printing, if the parameter is less than the selected threshold value. If the threshold is equal to three in this example, the layer complexity parameter of the layer will equal the threshold when the total printable area is equal to three times the accumulated area of the intersecting bounding boxes. If the accumulated area of a particular layer is greater than this, then the layer complexity parameter would be less than three and the layer may be identified as a complex layer. The object model may then be rejected. While the example above has a threshold value of three, any appropriate value may be used. The selected threshold may depend on various factors such as, for example, processor speed and the print resolution of the printer or print mode being used. In some examples, the value of the threshold may depend on the types of operations that are being performed by the printer. Also, while in one example a layer is identified as complex when the parameter is less than the threshold, in other examples other forms of comparison may be used. For example, the complexity parameter may correspond to a ratio of the accumulated area of the cross-sections of the bounding boxes to the total printable area, which is the inverse of the previous example, in which case a layer may be identified as a complex layer if the parameter is greater than the threshold.

In the example in FIG. 2, the layer 205 is identified as a complex layer. This may be identified using the examples described above. In this case, the method generates a revised object model at 216, representing a different arrangement of the one or more objects within the build volume. This revised object model may be generated by determining an alternative solution to the packing optimization function from a different seed value. Alternatively, the revised object model may be generated by determining a solution to a different packing optimization function. The revised object model is illustrated at 218, showing objects 207a to 207d, which correspond to objects 204a to 204d, but arranged in a slightly different configuration. The objects 207a to 207d have associated with them bounding boxes 208a to 208d. In this example, the method again evaluates layer complexity parameters for layers of the object model. Where no layer is determined to have a complexity parameter exceeding the given threshold, the method analyses all of the layers of the object model up to a final layer 209, as shown at 220. After determining the layer complexity parameter at 222 in accordance with any of the examples described above, the object model may be approved for printing at 224 if no complex layers have been identified. This approved object model may enable generation of printer data, which may be used by a printer to print the objects. If the object model is not approved, the method may continue repeating the generation of modified object models, for example using either different seed values or different packing optimization functions, until an object model is approved for printing, or a timeout period is exceeded.

In some examples, no approvable object models may be available for the selected optimization function, or may be found within the timeout period. In this case, it may be possible to change the optimization function for which the object model is being generated. For example, the method may switch from a thermal uniformity optimization function to a uniform layer density function. The method described above may be performed based on the new optimization function. The method may include generating different seed values for a number of different optimization functions. There may also be an associated timeout period, which, if exceeded, may mean that no approvable object models may be found. In this example, it may be possible for the pre-print application to identify which of the objects in the object model are resulting in the object models being determined to be too complex. One or more objects may be removed from the object model automatically, manually or a combination of both. The method described above may then be repeated for the object model data comprising fewer objects to be printed, or previously generated object models may be used, which have been stored and evaluated for complexity with the interfering objects having been removed.

Figure 3:
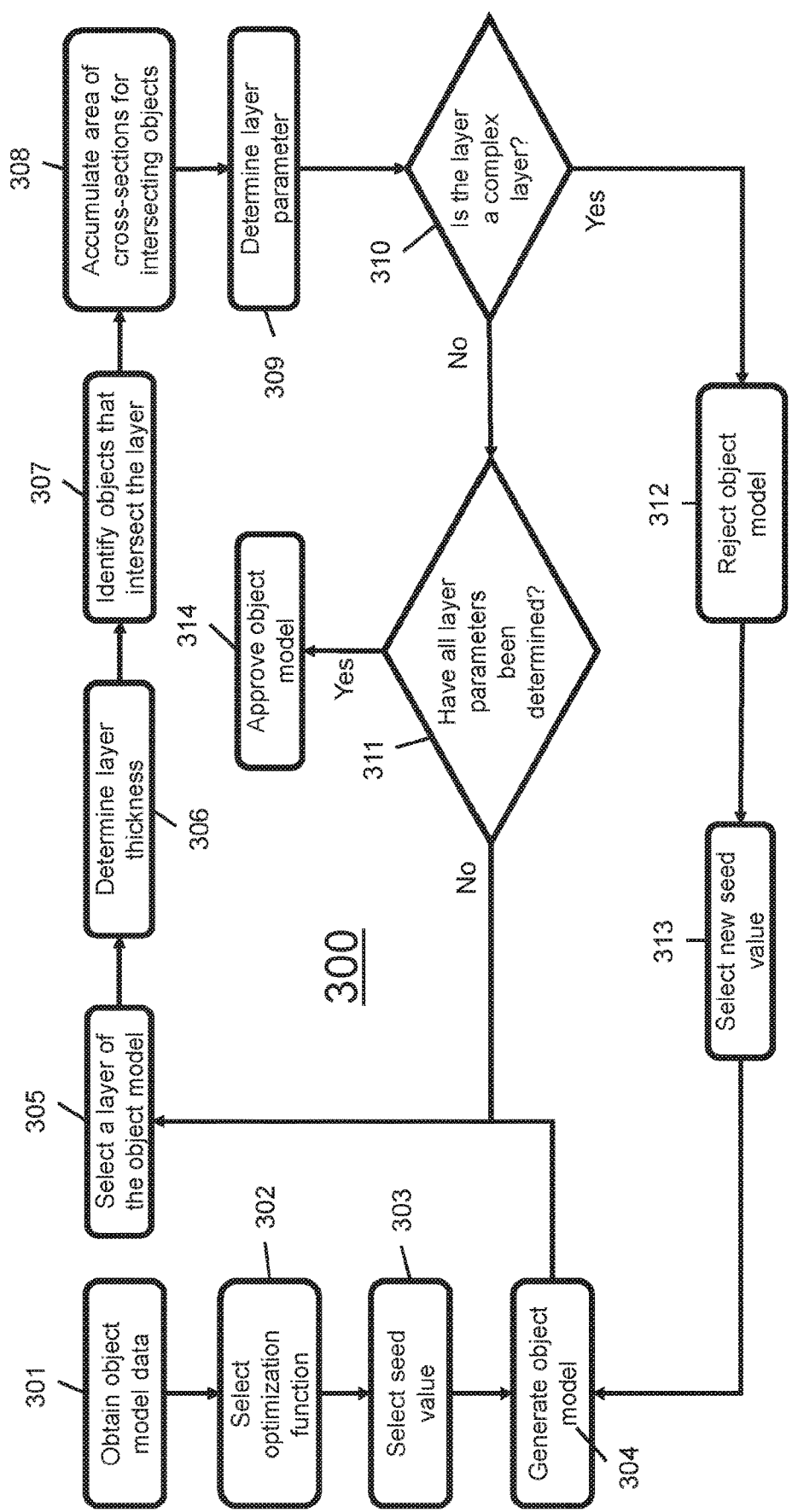
FIG. 3 is a flowchart showing a further example method for generating an object model that is suitable for printing.

FIG. 3 shows an example method for generating an object model that is suitable for printing, which may be understood in accordance with the description above. The method 300 obtains object model data at 301. This object model data may be parsed as described above, and so may represent one or more objects that are to be generated by a 3D printer, and respective bounding boxes for each of the one or more objects. In some examples, the object model data may not comprise the respective bounding boxes and these may instead be determined after obtaining the object model data.

At 302 an optimization function is selected, which may be any form of packing optimization function. The optimization function may be selected automatically, or manually by the user, or a combination of both. In some examples, the printer may be constrained with regard to which optimization functions may be selected. In some examples, the object model data may have associated with it the type of optimization function that should be used to generate the object model. For example, the optimization function may be one of the thermal uniformity or layer density functions described above, or any other form of packing function.

Based on the optimization function selected at 302, a seed value is selected at 303, from which the optimization function is run. At 304, a solution to the optimization function is determined, using the seed value, the solution representing a packing configuration for the one or more objects, and an object model is generated corresponding to this packing arrangement. For example, the object model may represent the position of the object(s) in the printable bed area of the printer. The object model may comprise a number of layers, representing the layers that may be printed during the printing process. A layer of the object model is selected at 305. This selection may be automatic, for example starting from the lowest layer in the z-axis, or may be manual, or a combination of both.

At 306 the thickness of the layer is determined, and objects whose bounding box intersects the layer are identified at 307. For each of these intersecting objects, cross-sectional areas of the bounding boxes at the layer height are determined and accumulated at 308. Based on this accumulated area, at 309 a parameter is determined for the layer, which represents the complexity of the layer. For example, this parameter may be measured as a comparison of the total printable area to the accumulated area. At 310 the layer complexity parameter is compared to a threshold in order to determine whether the layer is a complex layer. If the layer is identified as a complex layer, at 312 the object model is rejected. A new seed value is then selected at 313, which is used for generating a revised object model representing a different arrangement of the one or more objects within the build volume, and the revised object model is then evaluated for complexity in the manner described above. If the layer is not identified as a complex layer at 310, then at 311 it is determined whether layer complexity parameters have been determined for all layers of the object model. If not, the method proceeds back to 305 in order to select a new layer of the object model for analysis. If at 311 it is determined that layer complexity parameters have been determined for all layers of the object model, and no complex layers have been identified, the object model is approved at 314. This approval may reflect that the object model is suitable for printing.

While FIG. 3 illustrates an example method for generating an object model that is suitable for printing, modifications of this method are also possible. For example, a timeout period may be incorporated into the method, wherein the method will stop when this timeout period is exceeded. In some examples, the method may also comprise generating different object models based on different optimization functions, as is described above. If an approved object model is found, the method may also comprise generating printer data based on the approved object model. This printer data may enable a printer to print the one or more objects. It may therefore be possible for the method to be performed inside or outside of the printer. If performed outside, the approved object model or printer data may be sent to a printer. It may also be possible for various stages of the method to be divided between being carried out inside and outside of the printer.

In some examples, machine learning may be utilized. For example, the approved object model may be associated with multiple print jobs so that mass production techniques may be used. In some examples, the pre-print application may learn from previously approved object models. For example, this may reduce the time taken for future evaluations of layer complexity parameters. In this example, the pre-print application may have previously approved an object model based on a particular optimization function and seed value, and so these settings may be selected and/or suggested for a future print job containing the same or similar objects.

Figure 4:
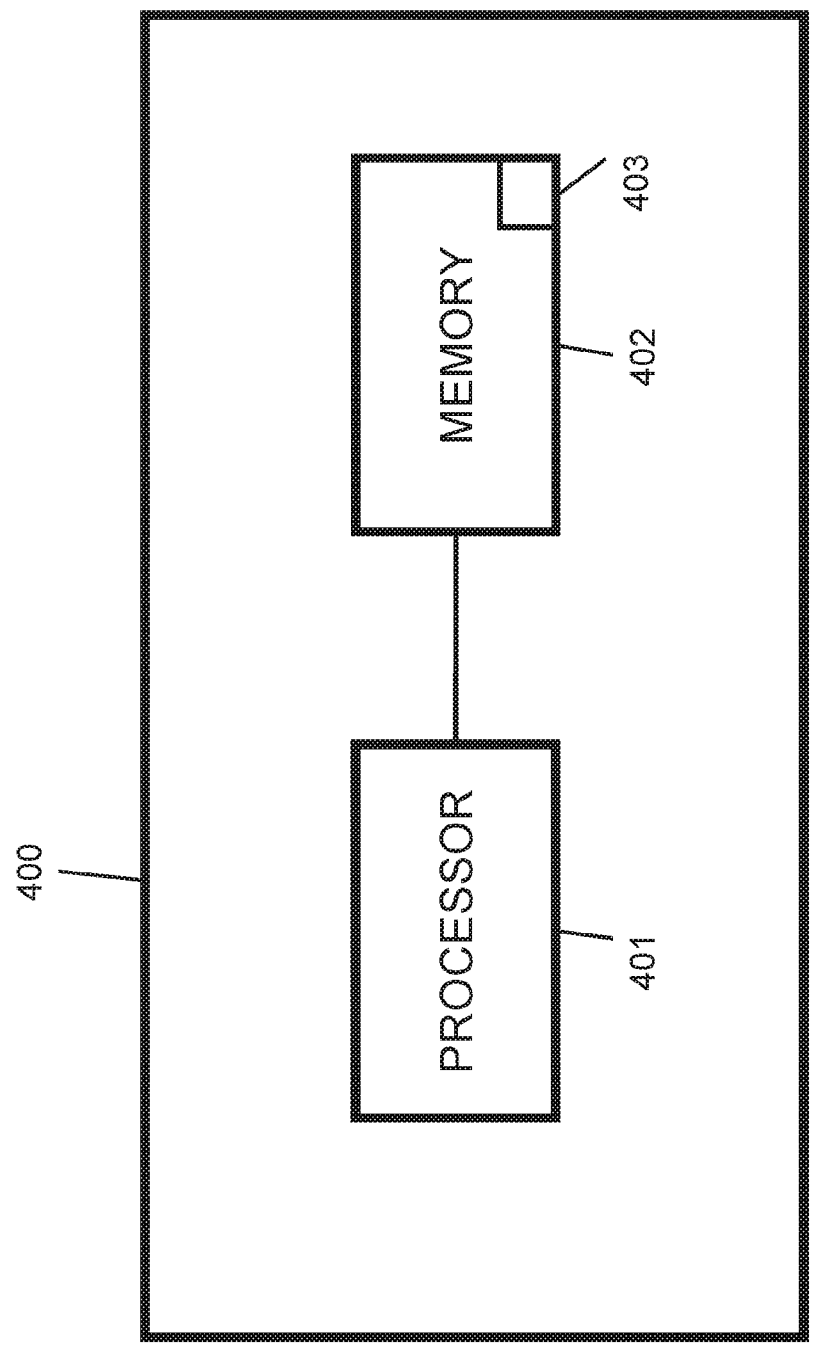
FIG. 4 shows an example controller to generate an object model that is suitable for printing.

FIG. 4 shows an example of a controller 400 to generate an object model that is suitable for printing. The controller 400 comprises a processor 401 and a memory 402. Stored within the memory 402 are instructions 403 for carrying out a method for generating an object model that is suitable for printing, in accordance with any of the examples described above. The instructions may also enable generation of printer data based on an approved object model. In one example, the controller 400 may be part of a computer running the instructions 403. In another example, the controller 400 may be part of a 3D printer which may be used to run the instructions 403 after obtaining object model data.

References to a printer, or 3D printer, in the above description may be understood to apply equally to other types of additive manufacturing system.

Figure 5:
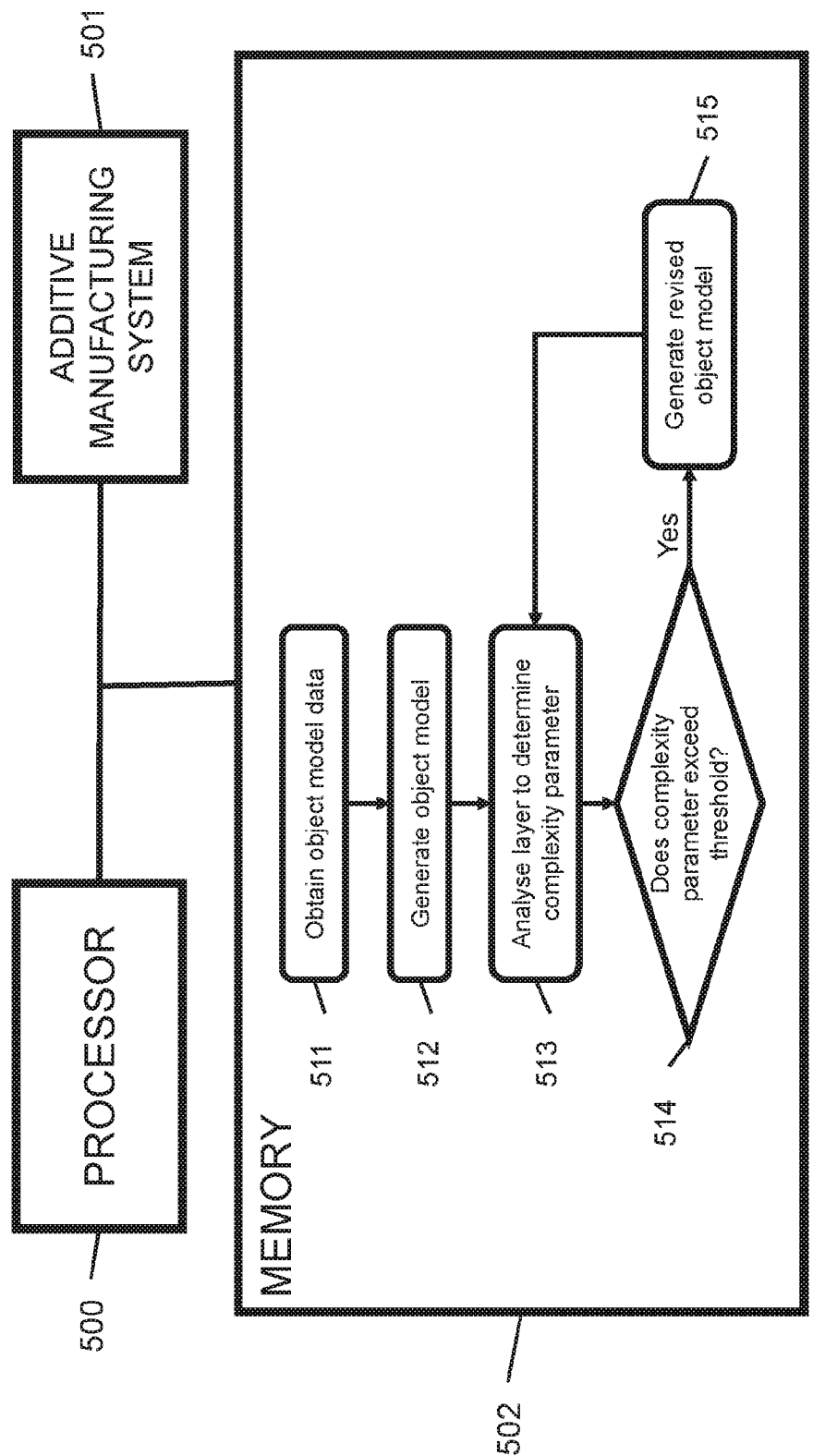
FIG. 5 shows an example of a computer readable medium comprising instructions to generate an object model that is suitable for printing.

FIG. 5 shows a memory 502, which is an example of a computer readable medium storing instructions 511 to 515 that, when executed by a processor 500 communicably coupled to an additive manufacturing system, in this case a 3D printer 501, causes the processor 500 to generate object models and determine whether they include layers that are too complex to be processed within the available layer processing time. This process may be performed in accordance with any of the examples described above. The instructions may also enable generation of printer data based on an approved object model. The computer readable medium 502 may be any form of storage device capable of storing executable instructions, such as a non-transient computer readable medium, for example Random Access Memory (RAM), Electrically-Erasable Programmable Read-Only Memory (EEPROM), a storage drive, an optical disc, or the like.

The invention claimed is:

1. A method comprising:
   a) obtaining, by a processor of a computing device different than a three dimensional printer, object model data representing a plurality of objects to be printed by the three dimensional printer;
   b) generating, by the processor, an object model representing an arrangement of the objects within a build volume, by determining a solution to a packing optimization function, the object model having a plurality of layers from a first layer to a last layer;
   c) on a layer-by-layer basis from the first layer to the last layer:
      c1) analyzing, by the processor, a current layer of the object model to determine a parameter representing a complexity of the current layer;
      c2) determining, by the processor, whether the determined parameter exceeds a given threshold corresponding to a layer complexity that is too complex for the three dimensional printer to successfully print the objects in accordance with the object model;
      c3) in response to the determined parameter for the current layer exceeding the given threshold, repeating from b) to revise the object model such that the representing a different arrangement of the one or more objects within the build volume; and
   d) once the determined parameter for every layer of the object model does not exceed the given threshold, transmitting, by the processor, the object model to the three dimensional printer to print the objects in accordance with the object model.

2. The method of claim 1, wherein the solution to the packing optimization function is determined from a seed value, and revising the object model comprises determining a different solution to the packing optimization function from a different seed value.

3. The method of claim 1, wherein revising the object model comprises determining a solution to a different packing optimization function.

4. The method of claim 1, wherein analyzing the current layer comprises:
   determining a bounding box for each object in the object model that intersects the current layer; and
   determining the parameter based on an accumulated area in the current layer of the bounding box of every object intersecting the current layer.

5. The method of claim 4, wherein the parameter is determined based on a ratio of (i) a total printable area in the current layer to (ii) the accumulated area in the current layer of the bounding box of every object intersecting the current layer.

6. The method of claim 1, further comprising:
selecting, by the processor, the packing optimization function to which the solution is to be determined from a predetermined set of optimization functions.

7. The method of claim 1, wherein the packing optimization function comprises at least one or more than one of: (i) a function for optimizing thermal uniformity across the build volume, and (ii) a function for optimizing a density of printed material in each layer.

8. A non-transitory computer-readable data storage medium storing a program executable by a processor of a computing device different than a three dimensional printer to perform processing comprising:
a) obtaining object model data representing a plurality of objects to be printed by the three dimensional printer;
b) generating an object model representing an arrangement of the objects within a build volume, by determining a solution to a packing optimization function, the object model having a plurality of layers from a first layer to a last layer;
c) on a layer-by-layer basis from the first layer to the last layer:
c1) analyzing a current layer of the object model to determine a parameter representing a complexity of the current layer;
c2) determining whether the determined parameter exceeds a given threshold corresponding to a layer complexity that is too complex for the three dimensional printer to successfully print the objects in accordance with the object model;
c3) in response to the determined parameter for the current layer exceeding the given threshold, repeating from b) to revise the object model such that the representing a different arrangement of the objects within the build volume; and
d) once the determined parameter for every layer of the object model does not exceed the given threshold, transmitting the object model to the three dimensional printer to print the objects in accordance with the object model.

9. The non-transitory computer-readable data storage medium of claim 8, wherein the solution to the packing optimization function is determined from a seed value, and revising the object model comprises determining a different solution to the packing optimization function from a different seed value.

10. The non-transitory computer-readable data storage medium of claim 8, wherein revising the object model comprises determining a solution to a different packing optimization function.

11. The non-transitory computer-readable data storage medium of claim 8, wherein analyzing the current layer comprises:
determining a bounding box for each object in the object model that intersects the current layer; and
determining the parameter based on an accumulated area in the current layer of the bounding box of every object intersecting the current layer.

12. The non-transitory computer-readable data storage medium of claim 8, wherein the processing further comprises:
selecting the packing optimization function to which the solution is to be determined from a predetermined set of optimization functions.

13. The non-transitory computer-readable data storage medium of claim 8, wherein the packing optimization function comprises one or more than one of: (i) a function for optimizing thermal uniformity across the build volume, and (ii) a function for optimizing a density of printed material in each layer.

14. A system comprising a computing device different than a three dimensional printer, the computing device including a processor and a memory storing instructions executable by the processor to perform processing including:
a) obtaining object model data representing a plurality of objects to be printed by the three dimensional printer;
b) generating an object model representing an arrangement of the objects within a build volume, by determining a solution to a packing optimization function, the object model having a plurality of layers from a first layer to a last layer;
c) on a layer-by-layer basis from the first layer to the last layer:
c1) analyzing a current layer of the object model to determine a parameter representing a complexity of the current layer;
c2) determining whether the determined parameter exceeds a given threshold corresponding to a layer complexity that is too complex for the three dimensional printer to successfully print the objects in accordance with the object model;
c3) in response to the determined parameter for the current layer exceeding the given threshold, repeating from b) to revise the object model such that the representing a different arrangement of the objects within the build volume; and
d) once the determined parameter for every layer of the object model does not exceed the given threshold, transmitting the object model to the three dimensional printer to print the objects in accordance with the object model.

15. The system of claim 14, wherein the solution to the packing optimization function is determined from a seed value, and revising the object model includes determining a different solution to the packing optimization function from a different seed value.

16. The system of claim 14, wherein revising the object model includes determining a solution to a different packing optimization function.

17. The system of claim 14, wherein analyzing the current layer includes:
determining a bounding box for each object in the object model that intersects the current layer; and
determining the parameter based on an accumulated area in the current layer of the bounding box of every object intersecting the current layer.

18. The system of claim 14, wherein the processing further includes:
selecting the packing optimization function to which the solution is to be determined from a predetermined set of optimization functions.

19. The system of claim 14, wherein the packing optimization function comprises one or more than one of: (i) a function for optimizing thermal uniformity across the build volume, and (ii) a function for optimizing a density of printed material in each layer.

20. The system of claim 14, further comprising the three dimensional printer.

* * * * *